(12) United States Patent
Shah

(10) Patent No.: US 11,380,359 B2
(45) Date of Patent: Jul. 5, 2022

(54) MULTI-STREAM VIDEO RECORDING SYSTEM USING LABELS

(71) Applicant: Nishant Shah, Aurora, IL (US)

(72) Inventor: Nishant Shah, Aurora, IL (US)

( * ) Notice: Subject to any disclaimer, the term of this patent is extended or adjusted under 35 U.S.C. 154(b) by 71 days.

(21) Appl. No.: 16/748,869

(22) Filed: Jan. 22, 2020

(65) Prior Publication Data

US 2021/0225404 A1 Jul. 22, 2021

(51) Int. Cl.
*H04N 9/80* (2006.01)
*G11B 20/10* (2006.01)
*G11B 27/00* (2006.01)
*H04N 5/93* (2006.01)

(52) U.S. Cl.
CPC ............... *G11B 20/10527* (2013.01); *G11B 2020/10592* (2013.01)

(58) Field of Classification Search
USPC ............................................... 386/248, 278
See application file for complete search history.

(56) References Cited

U.S. PATENT DOCUMENTS

| | | |
|---|---|---|
| 8,713,618 B1 | 4/2014 | Kuznetsov |
| 9,275,140 B2 | 3/2016 | Marraud |
| 9,436,875 B2 * | 9/2016 | Curcio ............... G06K 9/00744 |
| 9,583,144 B2 | 2/2017 | Ricciardi |
| 9,721,165 B1 | 8/2017 | Bentley |
| 9,767,364 B2 * | 9/2017 | Oguchi ............... G06F 16/7837 |
| 10,230,866 B1 | 3/2019 | Townsend |
| 10,462,353 B2 * | 10/2019 | Hoshino ................ H04N 1/215 |
| 10,622,017 B1 * | 4/2020 | Klitsner ............. H04N 21/4223 |
| 2008/0008458 A1 | 1/2008 | Gudipaty |
| 2008/0225119 A1 | 9/2008 | Murata |
| 2011/0052155 A1 | 3/2011 | Desmaris |
| 2014/0376876 A1 * | 12/2014 | Bentley .............. G06K 9/00744 386/227 |
| 2015/0128172 A1 | 5/2015 | Liwerant |
| 2015/0262616 A1 * | 9/2015 | Jaime .................. H04L 65/4076 386/228 |
| 2015/0324636 A1 * | 11/2015 | Bentley ................... A63F 13/00 386/227 |
| 2016/0105634 A1 * | 4/2016 | Marchese ............ H04N 9/8042 386/241 |

(Continued)

FOREIGN PATENT DOCUMENTS

| | | |
|---|---|---|
| CN | 105657575 B | 6/2016 |
| WO | WO2019157977 A1 | 8/2019 |

OTHER PUBLICATIONS

Search Report for PCT/US21/14753, dated Apr. 16, 2021.

(Continued)

*Primary Examiner* — Nigar Chowdhury
(74) *Attorney, Agent, or Firm* — The Law Offices of Konrad Sherinian, LLC

(57) ABSTRACT

A video recording system is disclosed and claimed. In particular, the disclosed video recording system maintains a master stream of video and audio when recording is initiated, but also allows the user to create additional label streams by activating an input control. The label stream can be terminated by activating the input control a second time. The label stream comprises only the portion of the video and audio between the activations of the input control, while the master stream will contain all audio and video that is recorded on the device.

9 Claims, 8 Drawing Sheets

(56) References Cited

U.S. PATENT DOCUMENTS

| | | | | |
|---|---|---|---|---|
| 2016/0225408 A1* | 8/2016 | Khan | ............... | H04N 5/772 |
| 2016/0322078 A1* | 11/2016 | Bose | ............... | H04N 5/247 |
| 2017/0004139 A1 | 1/2017 | Wong | | |
| 2018/0124306 A1* | 5/2018 | Mikawa | ............... | H04N 5/2354 |
| 2018/0124437 A1 | 5/2018 | Memisevic | | |
| 2018/0280783 A1* | 10/2018 | Gordon | ............... | G06F 3/0488 |
| 2018/0293906 A1 | 10/2018 | Chen | | |
| 2019/0045153 A1 | 2/2019 | Kennedy | | |
| 2019/0174189 A1 | 6/2019 | Zhang | | |
| 2019/0197187 A1 | 6/2019 | Zhang | | |
| 2019/0197316 A1* | 6/2019 | Bornfreedom | ............... | G11B 27/031 |
| 2019/0289359 A1 | 9/2019 | Sekar | | |
| 2019/0379822 A1* | 12/2019 | Leong | ............... | G11B 27/031 |
| 2020/0066305 A1* | 2/2020 | Spence | ............... | G11B 27/036 |

OTHER PUBLICATIONS

Bazarevsky, Mobile Real-time Video Segmentation, Google Research Article, Mar. 1, 2018, located at https://ai.googleblog.com/2018/03/mobile-real-time-video-segmentation.html.

Unknown, Video AI, Google Cloud Article, Unknown Date of Publication, located at https://cloud.google.com/video-intelligence/.

* cited by examiner

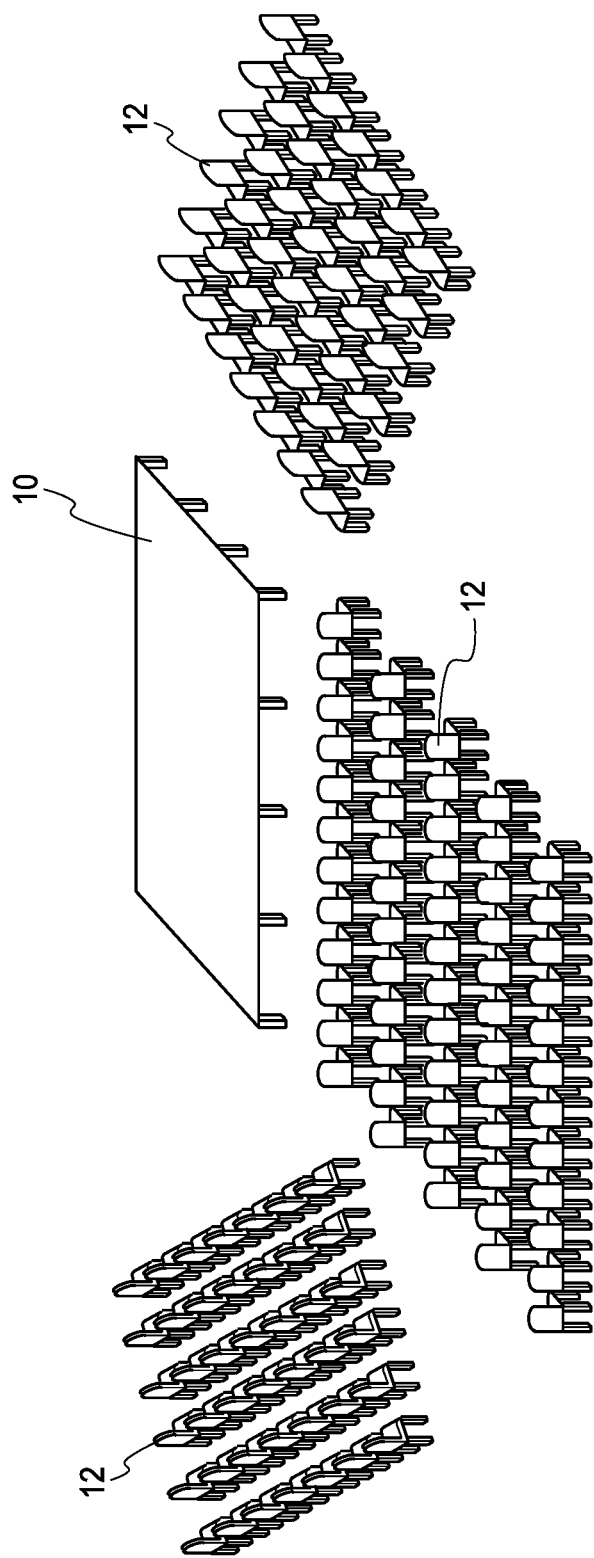

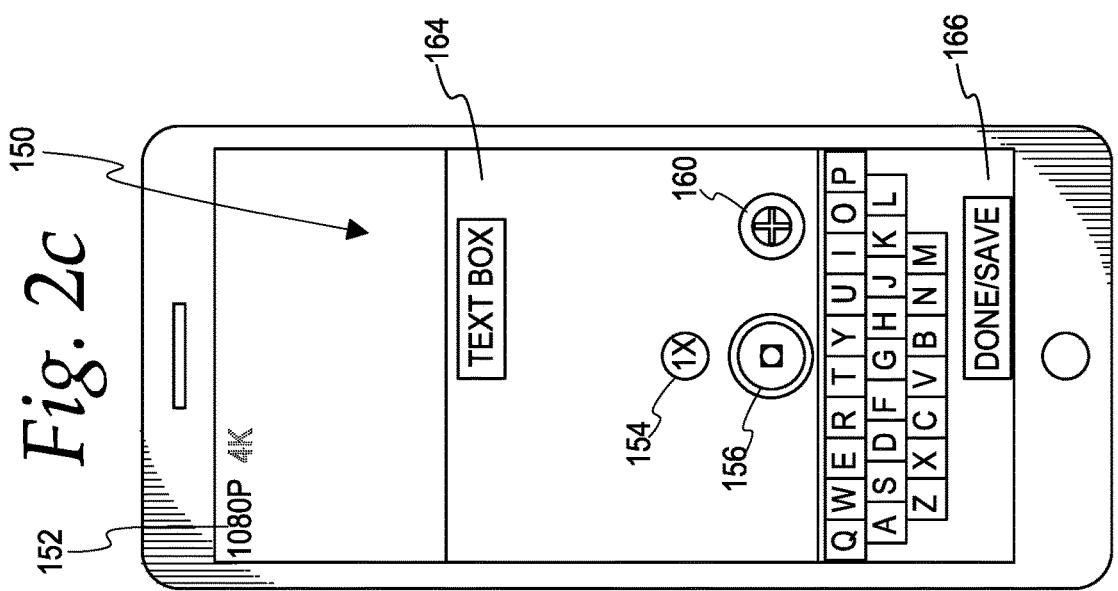
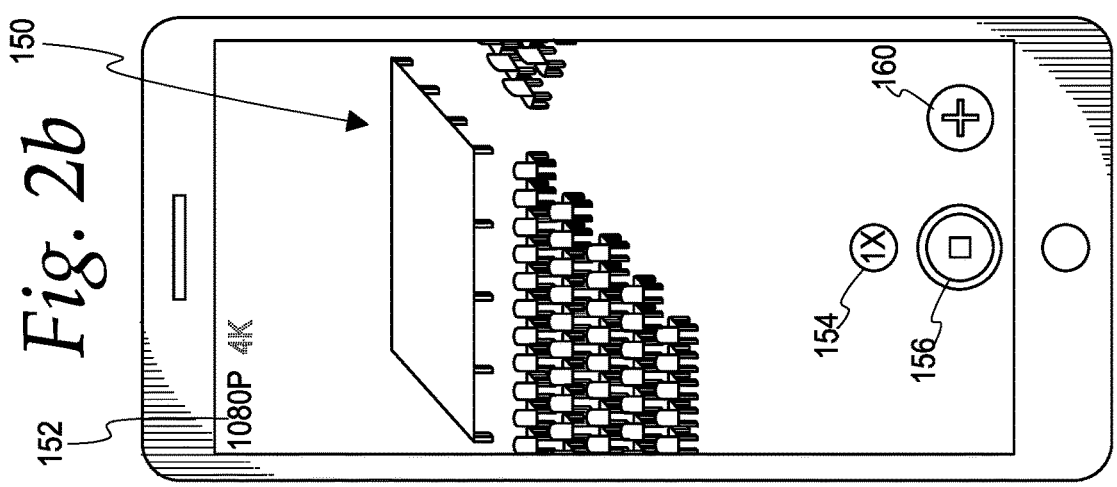
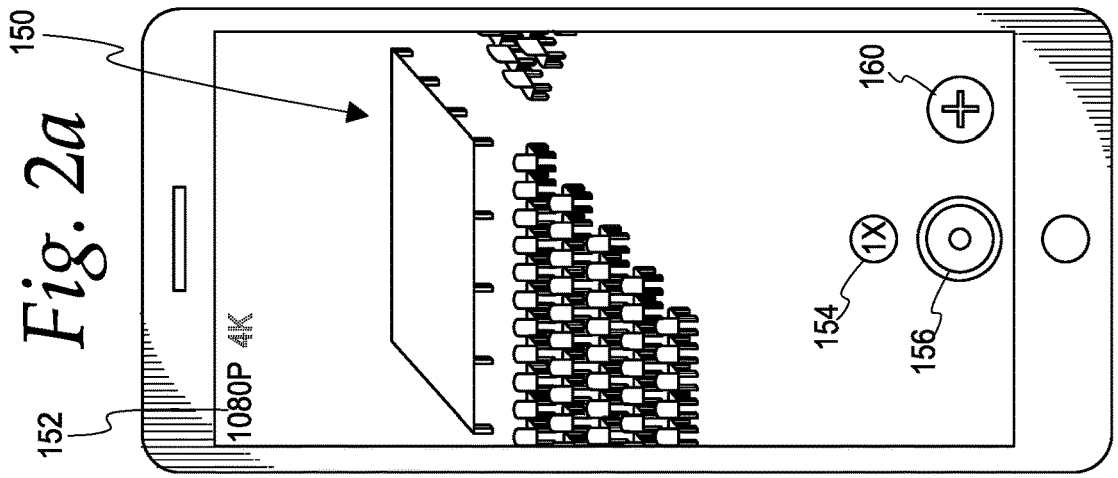

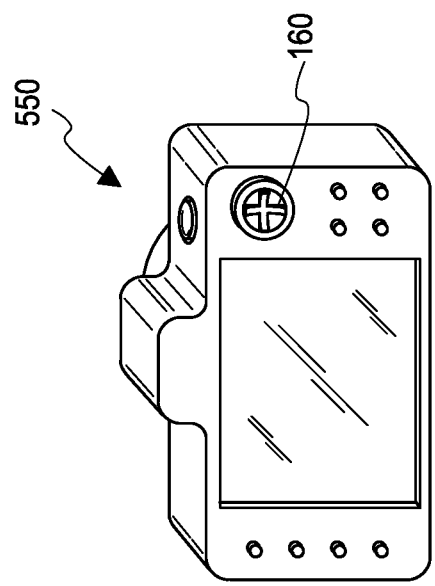
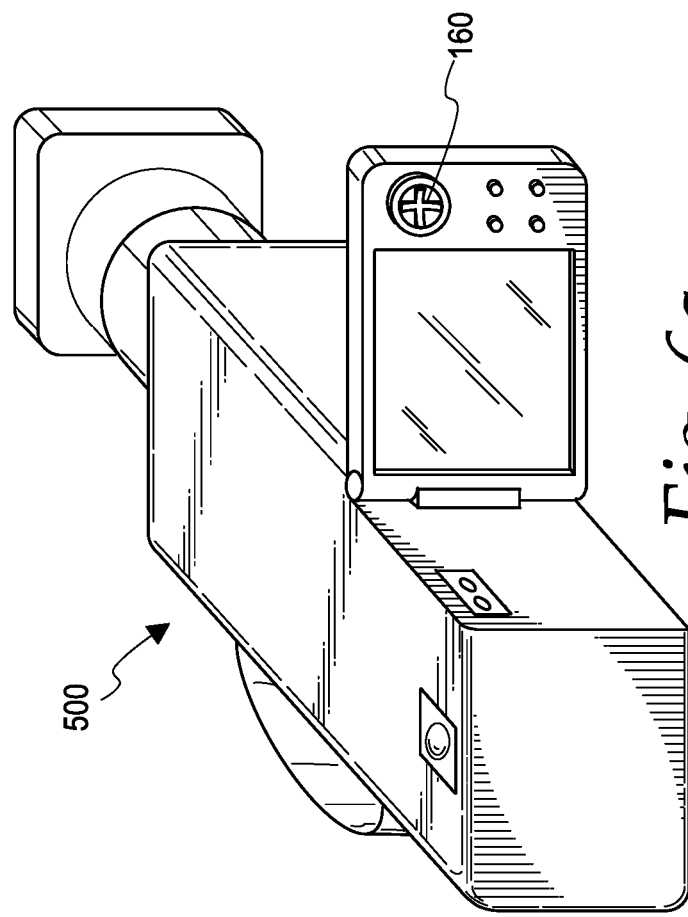

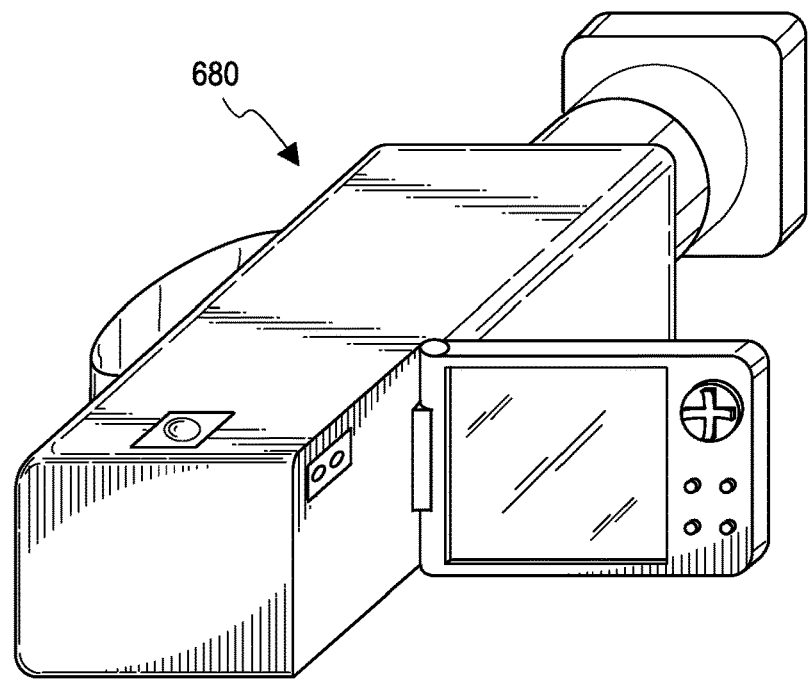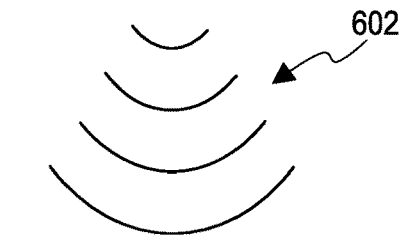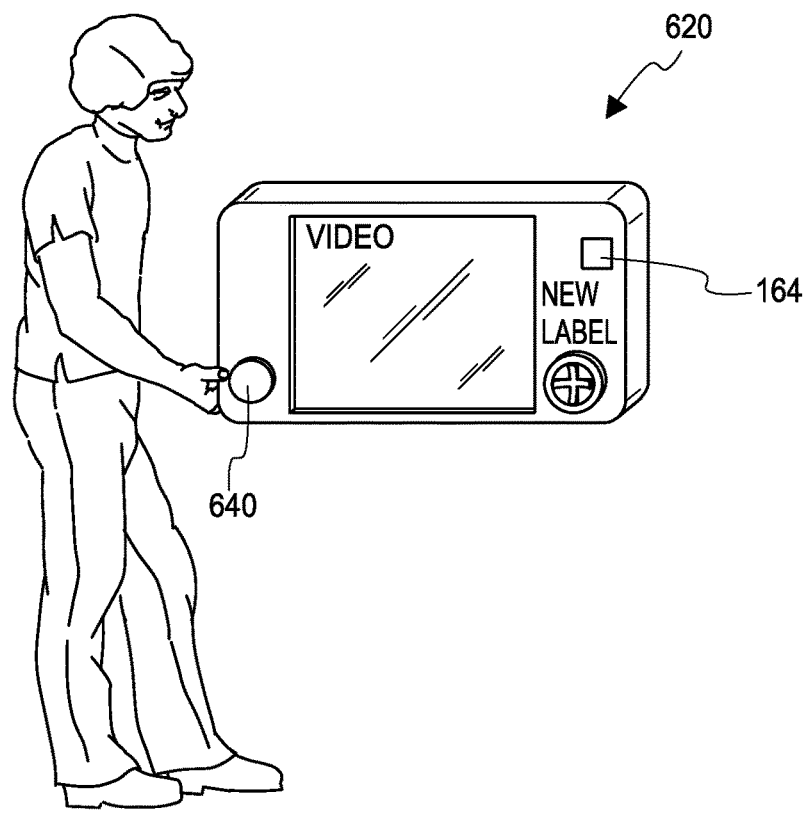
Fig. 7

MULTI-STREAM VIDEO RECORDING SYSTEM USING LABELS

CROSS-REFERENCE

None.

FIELD OF THE DISCLOSURE

The present disclosure relates to video recording systems, and more particularly, to video recording systems for recording multiple labeled streams of video, wherein each labeled video stream refers to a master video stream.

BACKGROUND

Video cameras have become ubiquitous. In particular, every smartphone produced can now record video in at least HD resolution, and many are capable of recording video at 4K resolution or even higher. Video cameras are now frequently used to record important events. For example, parents often will record their children's events, such as athletic contests, concerts, school plays, and other events. People often record other personal events, including weddings, graduations, and vacations, to name a few. Entertainment events, such as sporting events, theater performances, and other events, are also often recorded. Also, video cameras are often now used for public safety purposes. Security cameras are used by both governmental and private entities to secure certain locations, and traffic cameras are now commonly used for both speed and red-light policing. In addition, cameras are sometimes used in operating rooms so that a precise record of surgery can be maintained. Recording the surgery allows any mistakes to be ascertained after the surgery, which simplifies any resulting litigation. Similarly, recording a surgery allows a surgeon to prove that she executed a surgery within the standard of care.

The use of video recordings allows the details of the recordings to be kept forever, as long as sufficient digital storage is available. Given that a terabyte of cloud storage is now available at a nominal cost, it can be assumed that sufficient digital storage is available to store any video that is taken.

However, network bandwidth is still comparatively expensive in terms of both money and time. In particular, typical high-speed Internet download speeds range between 10 Mbps to 100 Mbps. Given that 4K video recorded at 30 frames per second requires approximately 375 MB of data, a typical high-speed Internet user might spend nearly an hour to download a 10-minute video; and the time to download a two-hour performance would be truly prohibitive. In most cases, however, the person downloading the video is only interested in a small portion of a video. For example, in the case of a school talent competition, a parent downloading the video is likely only interested in their child's performance; accordingly, the parent is likely interested in five minutes of a two-hour performance.

Presently, the only way that a parent could download a video of only their child's performance would be for the videographer or an editor to "slice" the master recording of the talent show into several smaller videos using post-processing software. For example, an editor could produce individual videos of each child's performance and label them appropriately in the school's video folder. This process would require the editor to use video editing software to identify natural breaks in the talent show performances (such as when each performer left the stage), and cut the master video file at those breaks using the video editing software. This process is time-consuming and requires the use of a second piece of highly technical software.

Accordingly, a need exists for the simplified creation of videos from a master video based on a specific event. Such an event could include different performances at a talent show, different acts in a play, a period within an athletic competition, changes of a traffic signal for traffic camera, or different phases of operation for an operating room camera.

OBJECTS OF THE DISCLOSURE

It is an object of the disclosure to provide a video recording system that allows an operator to easily mark one or more slices of a master video recording as comprising separate video streams in real-time.

It is another object of the disclosure to provide a video recording system that allows a videographer to mark one or more slices of a master video recording as comprising separate video streams in real-time.

It is another object of the disclosure to provide a video recording system that allows a remote monitor to mark one or more slices of a master video recording as comprising separate video streams in real-time.

It is another object of the disclosure to provide a smartphone that allows a videographer to mark one or more slices of a master video recording as comprising separate video streams in real-time.

It is another object of the disclosure to provide a video recorder that allows a videographer to mark one or more slices of a master video recording as comprising separate video streams in real-time.

It is another object of the disclosure to provide an add-on device for use with a video recorder that allows a videographer to mark one or more slices of a master video recording as comprising separate video streams in real-time.

It is another object of the disclosure to provide a smartphone that allows a remote monitor to mark one or more slices of a master video recording as comprising separate video streams in real-time.

It is another object of the disclosure to provide a networked video recorder that allows a remote monitor to mark one or more slices of a master video recording as comprising separate video streams in real-time.

It is another object of the disclosure to provide a networked add-on device for use with a video recorder that allows a remote monitor to mark one or more slices of a master video recording as comprising separate video streams in real-time.

It is another object of the disclosure to provide a simple-to-use user interface allowing a user to mark one or more slices of a master video recording as comprising separate video streams in real-time.

Other advantages of this disclosure will be clear to a person of ordinary skill in the art. It should be understood, however, that a system, an apparatus or a method could practice the disclosure while not achieving all of the enumerated advantages, and that the claims define the protected disclosure.

SUMMARY OF THE DISCLOSURE

The present disclosure provides a system and method for creating multiple related video streams out of a single master video stream. Aspects of the present disclosure address one or more of the objectives mentioned above by describing a system and method for creating multiple related video streams out of a single master video stream. The following presents a much-simplified summary of the disclosure in order to provide a basic understanding of some aspects of the systems and methods for creating multipole video streams out of a single master video stream. This summary is not intended to identify key or critical elements or aspects of the disclosure, nor is it intended to set forth or delineate the scope of the claims of this application for patent. The following summary merely presents some of the concepts of the disclosure in a simplified form as a prelude to the more detailed description provided below.

A video recording system is described and claimed herein. In particular, the video recording system comprises a body, including a lens. A sensor, such as a CMOS sensor or a CCD sensor is disposed within the body and optically coupled to the lens; i.e., light gathered by the lens is directed to the sensor. The sensor produces a stream of digital video data that is analyzed and framed by a video processor that is coupled to the sensor. The video processor writes digital video frame data to a storage device, such as FLASH memory.

The video recording system also includes a processor that is coupled to the storage device and maintains a logical master stream of digital video. The logical master stream includes a start pointer and an end pointer. The start pointer is set to the first location of storage where the video for the particular stream was recorded, and the end pointer is set to the location of storage holding the most recently written frame of digital video data. Also, the video recording system includes an input control coupled to the processor that, on activation, creates a second logical stream of video. The second logical stream of the video includes a start pointer that is set to the most recent value of the end pointer of the logical master stream of video data.

In an additional embodiment of the disclosed video recording system, the second logical stream of video further comprises a second end pointer, and, when the input control is activated a second time, the second end pointer is set to the value of the end pointer of the logical master stream at the time that the input control is activated the second time.

Also, when the input control is activated a second time, a name can be assigned to the second stream of video. The name can either be automatically generated, using, for example, a date and time index, or the name can be entered manually by a user.

Additional logical streams of video can be created by activating the input control.

The input control can be, for example, a hard button, a touch display on a smartphone, a voice control, or another type of control. In addition, in certain embodiments, the video recording system can be network controlled. In such an embodiment, the video recording system will include a network port and will stream video data to a remote site. It will also receive network commands, including activation of the input control to create and manage additional streams from the remote site.

The disclosed video recording system can be implemented as, for example, a smartphone, a digital camcorder, or a digital camera.

BRIEF DESCRIPTION OF THE DRAWINGS

Although the characteristic features of this disclosure will be particularly pointed out in the claims, the disclosed method and system, and how it may be made and used, may be better understood by referring to the following description taken in connection with the accompanying drawings forming a part hereof, wherein like reference numerals refer to like parts throughout the several views and in which:

FIG. 1 is a perspective view of a stage surrounded by rows of seating being recorded by a video recording system.

FIGS. 2a through 2f are screenshot views of an exemplary touchscreen user interface for a video recording system constructed per this disclosure.

FIG. 6a is a perspective view of a digital camcorder implementing the label stream feature disclosure herein.

FIG. 6b is a perspective view of a digital camera implementing the label stream feature disclosed herein.

FIG. 7 is a perspective view of a video recorder system utilizing a wireless control device live streaming video to a wireless control device.

Figure 2D:
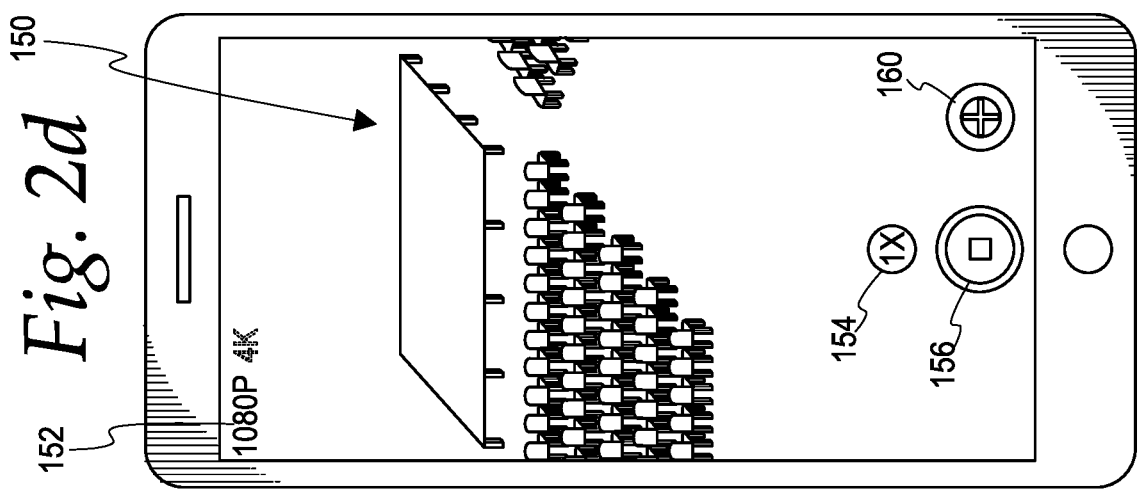

A person of ordinary skills in the art will appreciate that elements of the figures above are illustrated for simplicity and clarity and are not necessarily drawn to scale. The dimensions of some elements in the figures may have been exaggerated relative to other elements to help to understand the present teachings. Furthermore, a particular order in which certain elements, parts, components, modules, steps, actions, events and/or processes are described or illustrated may not be required. A person of ordinary skills in the art will appreciate that, for simplicity and clarity of illustration, some commonly known and well-understood elements that are useful and/or necessary in a commercially feasible embodiment may not be depicted to provide a clear view of various embodiments per the present teachings.

DETAILED DESCRIPTION

In the following description of various examples of embodiments of the disclosed system and method, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

Turning to the Figures and FIG. 1 in particular, a video camera 100 films a performance on stage 10 surrounded by numerous chairs 12. As explained herein, the video camera 100 can be a digital camcorder, a digital camera, or even a smartphone. In particular, an operator 16 aims the video camera at performers (not shown) on the stage and records their performance. A person of ordinary skill in the art would understand that while the disclosed system and method are depicted as recording a performance on a stage, the functional and structural features of the disclosed system and method can be translated to other environments with little or no modification. For example, the disclosed system and method can easily be translated for use in security cameras, traffic cameras, and operating room cameras.

Turning to FIGS. 2a through 2f, an exemplary interface for the camera operator is disclosed. The exemplary interface operates on a video device, that includes, for example, a lens and sensor. In particular, the exemplary interface is shown as being implemented on a smartphone, tablet, or other handheld assistants. However, it should be understood that the principles of the interface can easily be used on other types of devices as well, such as digital camcorders, digital cameras, or remote-control software operating on a computer or other device, The exemplary interface includes a video area 150, which depicts a real-time view of a scene captured from the lens. The exemplary interface also includes a resolution indicator 152. In particular, as depicted, video resolution is presently set at 1080P, but an option for 4K video is also present. By pressing the 4K portion of the resolution indicator 152 a user can change the recorded video resolution from 1080P to 4K. Other resolutions can also be used, and no particular resolution is a limitation of this disclosure. The exemplary interface also includes a zoom control 154. As depicted, the zoom control 154 allows a user to cycle through several zoom options, such as 1×, 2×, and 4×. Alternatively, the zoom control 154 can be pressed to the left to zoom out and to the right to zoom in, with near analog granularity. Other zoom interfaces are also possibly, and the specific configuration and use of the zoom control 154 is not a limitation of this disclosure. By adjusting the zoom control 154 the scene depicted in the video area 150 will either zoom in or out accordingly, depending on how the zoom is being adjusted.

The exemplary interface also includes a record control 156. The record control 156 allows the user to initiate the recording of video, or cause the recording of video to pause or stop. The record control 156 is shown as inactive (not recording) in FIG. 2a and active (recording) in FIG. 2b. In particular, as depicted, the record control has 156 a circle in the middle of the control when inactive, and a square in the middle of the control when active (recording). It should be understood that many other representations of the record control 156 and its active and inactive state can be utilized and still fall within the scope of the disclosed system and method.

The exemplary interface also includes a new control, which is referred to herein as a stream control 160. Typically, when the record control 156 is not active, the stream control 160 will be displayed as inactive, i.e., as it is depicted in FIGS. 2a and 2b. However, when the record control 156 is active, the stream control 160 can be activated, and when first activated, as it is in FIG. 2c, a keyboard, such as a smartphone system keyboard, can appear to allow a stream name to be entered in a label name control, such as, for example, a text box 164. Once the name is selected, the done/save button 166 can be pressed to save the name for the newly created label stream. For the sake of clarity, the illustrated interface displays the stream control 160 as a circle containing a plus sign when inactive, and a circle containing a smaller circle immediately surrounding a plus sign when active. When the stream control 160 is pressed, and as explained further herein, the video recording system 100 will create an additional label stream. In particular, the video recording system 100 will continue to record the main video stream, which is hereafter referred to as the master video stream. In addition, the video recording system 100 will also create a new label stream starting at the time index that the stream control 160 is activated and continuing until the stream control 160 is pressed again. The new label stream created by the stream control 160 is a subset of the master stream; i.e., it contains the same video and audio content as the master stream except that it is limited to the video encompassed by a starting time index and an ending time index.

When the stream control 160 is pressed a second time, the new label stream is assigned an end time index, and the new label stream is closed. Also, the appearance of the stream control 160 can be toggled when the stream control 160 is pressed. For example, when the stream control 160 is pressed the first time, the stream control 160 can be highlighted with an additional interior circle around the depicted plus sign or using some other type of highlight to indicate that a label stream is presently being created. When the stream control 160 is pressed a second time, the highlight of the stream control 160 can be removed so that the camera operator knows that only the master stream is presently being recorded.

Figure 2E:
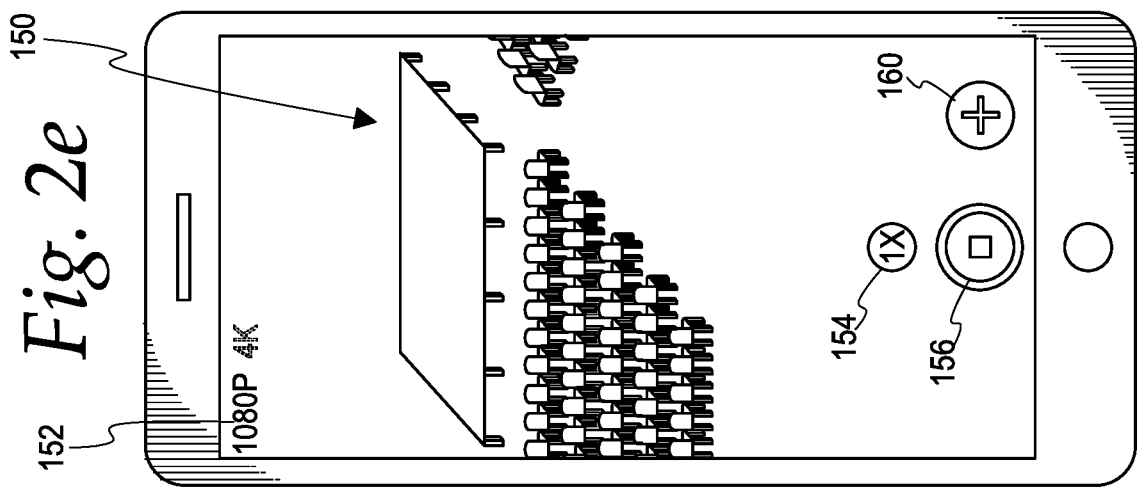
Figure 2F:
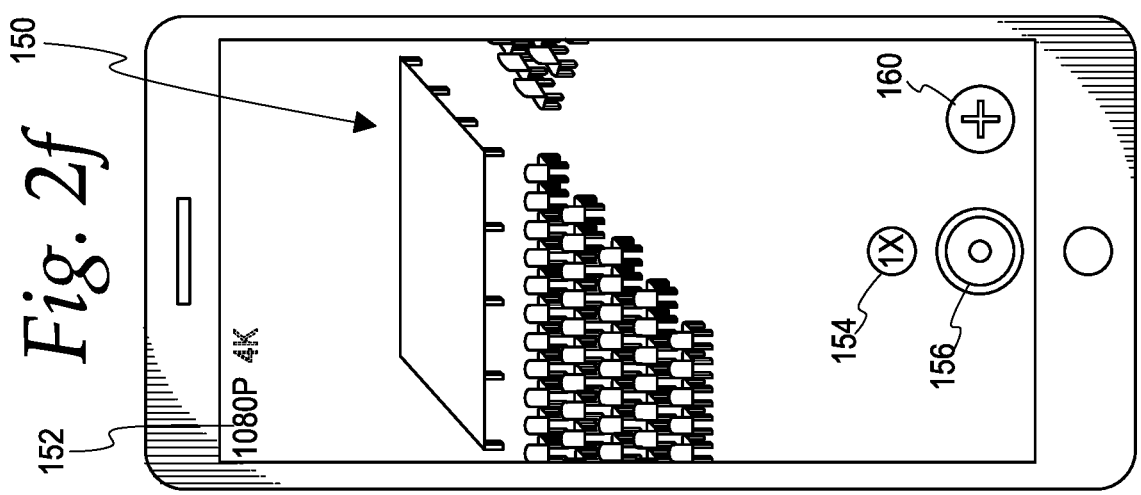

This latter sequence is depicted in FIGS. 2d through 2f. In FIG. 2d, the master stream is active, as indicated by the record control 156 being active. In addition, in FIG. 2d, a label stream is also active, as depicted by the label control 160 being active. In FIG. 2e, the label stream has been deactivated, as seen by the label control 160 being inactive, and in FIG. 2f, the master stream has been deactivated, as depicted by the record control 156 being inactive.

Figure 3:
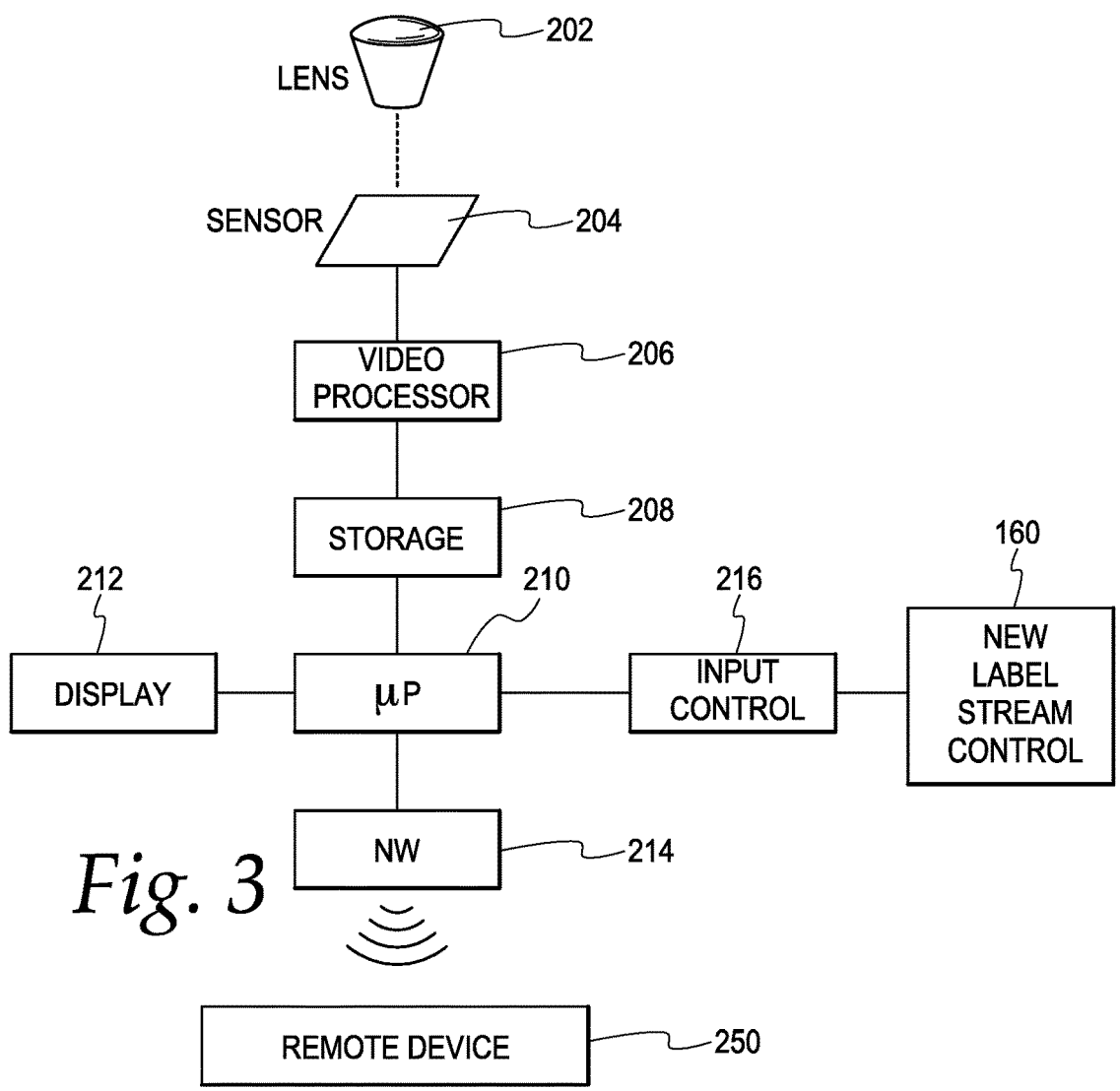
FIG. 3 is a simplified block diagram of a video recording system constructed per this disclosure.

Turning to FIG. 3, a simplified block diagram of a video recording system 100 is depicted. In particular, the primary components of a video recording system 100 are depicted, whether the actual video recording system 100 is a smartphone, a digital camera, or a digital camcorder. Typically, the components of the video recording system 100 will reside in a body (not shown in this figure), although it is possible in certain implementations that different components can reside in separate enclosures, such as in the embodiment depicted in FIG. 7. The video recording system 100 will generally include a lens 202. The lens can be, for example, a small curved glass lens with a focal length of about 18 mm to 55 mm, although it should be noted that the characteristics of the lens, and even the inclusion of the lens, is not a limitation of this disclosure. The lens focuses incoming light onto a sensor 204. The sensor 204 can be, for example, a CCD sensor, a CMOS sensor, or another equivalent sensor. In addition, the size of the sensor 204 can vary from full-frame or larger down to arbitrarily small sensors. Typically, the output of a video sensor 204 will be processed by a video processor 206, which will process the video from the sensor and write or commit full frames of video to storage 208. The video processor 206 may process data from the sensor 204 at a frame rate such as, for example, 60 Hz, although other frame rates, such as 15 Hz, 24 Hz, 30 Hz, 90 Hz, 120 Hz, 240 Hz, 480 Hz, 960 Hz, 1920 Hz, or other, arbitrary frame rates can also be used. The video processor 206 may write frame data directly to storage 208 via a DMA channel. However, the processor 210 can also read data from the video processor (or directly from the sensor 204) and write the frame data to storage 208. Accordingly, in certain embodiments of the disclosed video recording system 100, the video processor 206 is entirely extraneous and is not a limitation of this disclosure.

The storage 208 used by the video recording system 100 will typically be FLASH memory, although the primary limitation is that the write speed of the storage 208 is sufficient for the frame rate that the video recording system 100 is operated. The amount of storage can vary, but 1 GB of storage can hold a bit less than 20 minutes of 1080P video at 60 FPS (frames per second). The FLASH memory modules may, for example, be UFS 3.0 FLASH memory or a similar type of FLASH memory that offers sufficient read/write performance.

The microprocessor 210 reads frame data from storage and displays it in real-time on the display 212. The microprocessor 210 also performs housekeeping activities, such as configuring the video processor 206, interfacing with external devices (not shown), accepting input controls 216, and interfacing with an external network 214. The microprocessor 210 can be any suitably fast microprocessor or microcontroller that has appropriate interface capabilities, ranging from an 8-bit device, such as a Microchip® PIC® variant, or similar device, to a 64 bit ARM or x86 device, such as, for example, an ARM Cortex A76 variant.

The input controls 216 allows the camera operator to control the operation of the video recording system 100. The input controls 216 can include, for example, a touch screen system, or a collection of buttons, sliders, joysticks, gesture controls, voice controls, and other input controls, as are typical in video recording systems. The stream control 160 is one of the input controls 216.

The display 212 can be, for example, a Liquid Crystal Display (LCD), an LED or an OLED display, or another type of display as long as the display is of sufficient resolution and refresh rate for the video camera operator to obtain a reasonable view of the scene that is being recorded. In certain implementations, the display 212 can be a touch-sensitive display, so that touch-sensitive input controls can be implemented as needed.

The network interface 214 will typically be wireless using a variant of 802.11, although other wireless networking technology, or even a wired network, can be employed. For example, a 4G or 5G cellular network could also be used, as their transfer speeds are fast enough to accommodate the video streaming and transfer required of the network interface 214. The network interface 214 can be employed for a variety of purposes, including remote control by a remote operator. In such a scenario, the processor 210 may run software, including a video server that will stream the recorded video to a remote site, as well as software to accept various network commands from the remote site. When utilized, the remote device 250 can oversee the operation of the video recording system 100. For example, the remote device 250 can send a command to create a new label stream or terminate a label stream that is presently recording. In certain implementations, the video may not be streamed to the remote site so that lower bandwidth implementations, like BlueTooth®, Zigbee®, or Z-Wave®, could be used. A remote device without streamed video would allow for the implementation of a remote device 250 that could serve solely as a label control 160 and allow the camera operator to hold the remote device 250 in one hand to manage label streams while viewing an event in a location distant from the video camera.

It should be noted that certain embodiments may not include all of the components illustrated in FIG. 3 and described above. For example, a "screen capture" implementation of the disclosed video recording system 100 would not require a lens 202, a sensor 204, or a video processor 206. In addition, such an embodiment may not require a network interface 214 or a remote device 250. Other embodiments may similarly not require certain components. In addition, certain other components, such as a microphone, may be present in the video recording system 100, but have been omitted for brevity and clarity.

Figure 4:
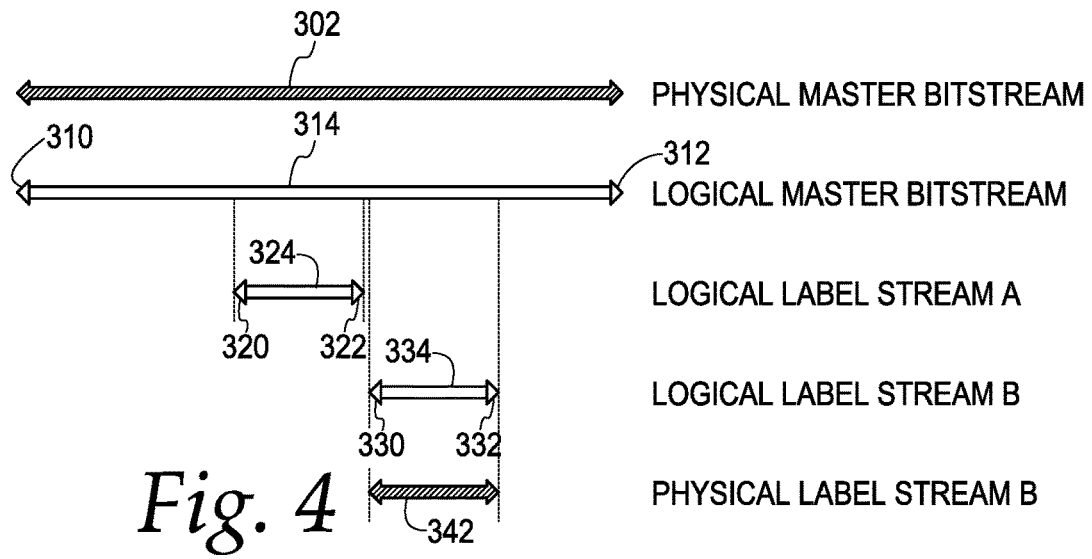
FIG. 4 is a structure diagram illustrating the different types of streams discussed herein and the relationship between those different types of streams.

FIG. 4 visually depicts different stream types. While the terms "video stream" or "stream" are used herein, it should be understood that a stream can include both video and audio. At the top is shown the physical master stream 302. The physical master stream 302 is shown as filled in to show that this stream occupies physical memory locations in the storage 208; i.e., it has been written to a physical medium. Generally, a given video recording system 100 will only have one active physical master stream 302 at a time. The physical master stream 302 is instantiated when, for example, the user activates the record control 156, as depicted in FIGS. 2a-2b. Beneath the physical master stream 302 is a logical master stream 314, which is shown as an outline to indicate that it is strictly a logical construction; i.e., it exists as a pair of pointers to physical memory locations. In particular, a logical stream consists of a start pointer 310—in the case of the logical master stream, the start pointer will point to the start of the physical master stream. The logical stream also includes an end pointer 312—in the case of the logical master stream, the end pointer will point to the memory locations in storage 208 holding the most recent frame of video that has been recorded. The end pointer 312 of the logical master stream will be updated after every frame. It should be noted that the creation of a logical master bitstream 310 is a matter of programming convenience, and the disclosed video recording system 100 can be implemented without creating a logical master bitstream 310.

When a label stream is created, it is created as a logical stream, and its start pointer is assigned to the present end pointer 312 of the logical master stream 314. This operation corresponds to, for example, a user activating a label control 160, as depicted in FIG. 2c. As the video is recorded and stored in the physical master bitstream 302 and tracked by the logical master bitstream 312, the end pointer of the label stream is continuously updated to match the end pointer of the logical master stream; i.e., it will point at the latest frame of video that has been recorded. When the label stream is ended, it's end pointer is fixed to the value of the end pointer 312 at the time that the label stream is ended. The fixing of the end pointer of the label stream can correspond to a second press of the label stream control 160, as depicted in FIGS. 2d and 2e. For example, logical label stream A 324 has its start pointer 320 pointing to a first-time index of the logical master stream 314, and its end pointer 322 pointing to a second-time index of the logical master stream 314 that is later than the first-time index. Logical label stream B 334 was created a short time after the end of logical label stream A; accordingly, the start pointer 330 of logical label stream B has a later time index than the end pointer 322 of logical label stream A. Similarly, the end pointer 332 of logical label stream B 334 has a somewhat later time index than the start pointer 330 of logical label stream b 334. While label streams can be utilized in a strictly logical format, in certain cases, it may be desirable to write the label streams to actual physical storage. In such a case, a physical stream can be created. For example, in the case of logical label stream B 334, a corresponding physical stream 342 is also shown. Similarly, the creation of logical label streams can be done away with entirely, and physical streams can be created instead, which will result in duplication of memory storage used for the label streams.

Figure 5:
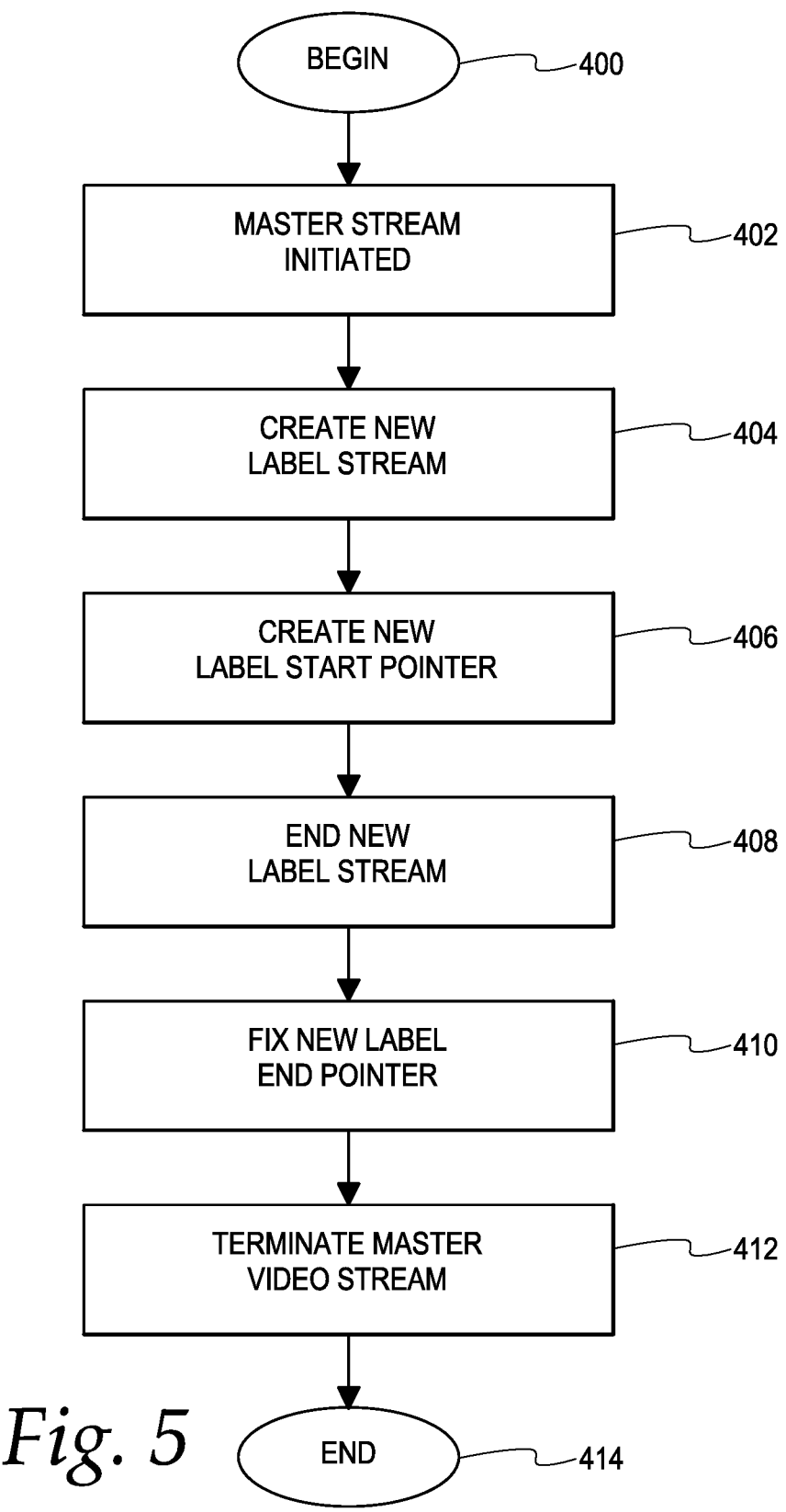
FIG. 5 is a simplified flow chart illustrating the software operation of a video recording system constructed per this disclosure.

Turning to FIG. 5, a simplified flowchart depicting the operation of a video recording system 100 constructed in accordance with this disclosure is shown. In particular, in step 400, the video recording system 100 is initiated; i.e., it is turned on; startup tasks are performed, etc. In step 402, the record control 156 is activated, and a master stream initiated. As explained above, this would create both a physical master stream and a logical master stream. This step corresponds to, for example, the activation of the record control 156, as depicted in FIGS. 2a and 2b. In step 404, a new label stream is created, and in step 406, the new label stream start pointer is created. As explained above, the new label stream's start point is set to the present end pointer of the logical label stream. This operation corresponds to, for example, the activation of the label control 160, as depicted in FIGS. 2b and 2c. In step 408, the label stream is ended, and its end pointer is fixed to the most recent value of the logical master stream in step 410. This operation corresponds to, for example, a second activation of the label control 160, as depicted in, for example, FIGS. 2d and 2e. In step 412, the master stream is terminated, which is usually accomplished by the user pressing the record control 156 again to cease recording, as depicted in, for example, FIGS. 2e and 2f. In step 414, the video recording system 100 is turned off, ending the operation of the system.

While the user interfaces for the creation of label streams have been shown in the context of a smartphone implementation, FIGS. 6a and 6b illustrate how a digital camcorder 500 and the digital camera 550 could utilize the disclosed label stream feature respectively. In particular, the addition of a stream control 160 to the standard controls already present in a digital camcorder 500 or a digital camera 550, along with the disclosed software changes, would allow implantation of disclosed label stream feature.

Also, one additional embodiment of the label stream system is envisioned. In particular, a software implementation for use with existing digital cameras and digital camcorders could also be constructed, so long as the existing device supported live streaming. Such an implementation would have the advantage of being able to continue to use an expensive, well-functioning camera, while still enjoying the benefits disclosed herein.

Turning to FIG. 7, an embodiment of such a label stream system is pictured. In particular, a digital recording device 680 has an integrated live streaming function with which it broadcasts video data over a wireless network 602, such as an 802.11 network. A wireless control device 620 receives the live stream from the digital recording device 680 over the wireless network 602. The wireless control device 620 will include certain components similar to the video camera 100 of FIG. 3, including a display, which can again be a touch-sensitive display, a processor, storage, and input controls, such as UI widgets that are displayed on the touch-sensitive display, or other buttons, sliders, joysticks, and voice controls. In addition, the wireless control device will contain a wireless network port. Software operating on the wireless network 602 implements the label stream functionality disclosed herein. In particular, the software implements a stream control 160, as well as a label name control 164 that could function similarly to the embodiment previously disclosed herein.

Figure 8:
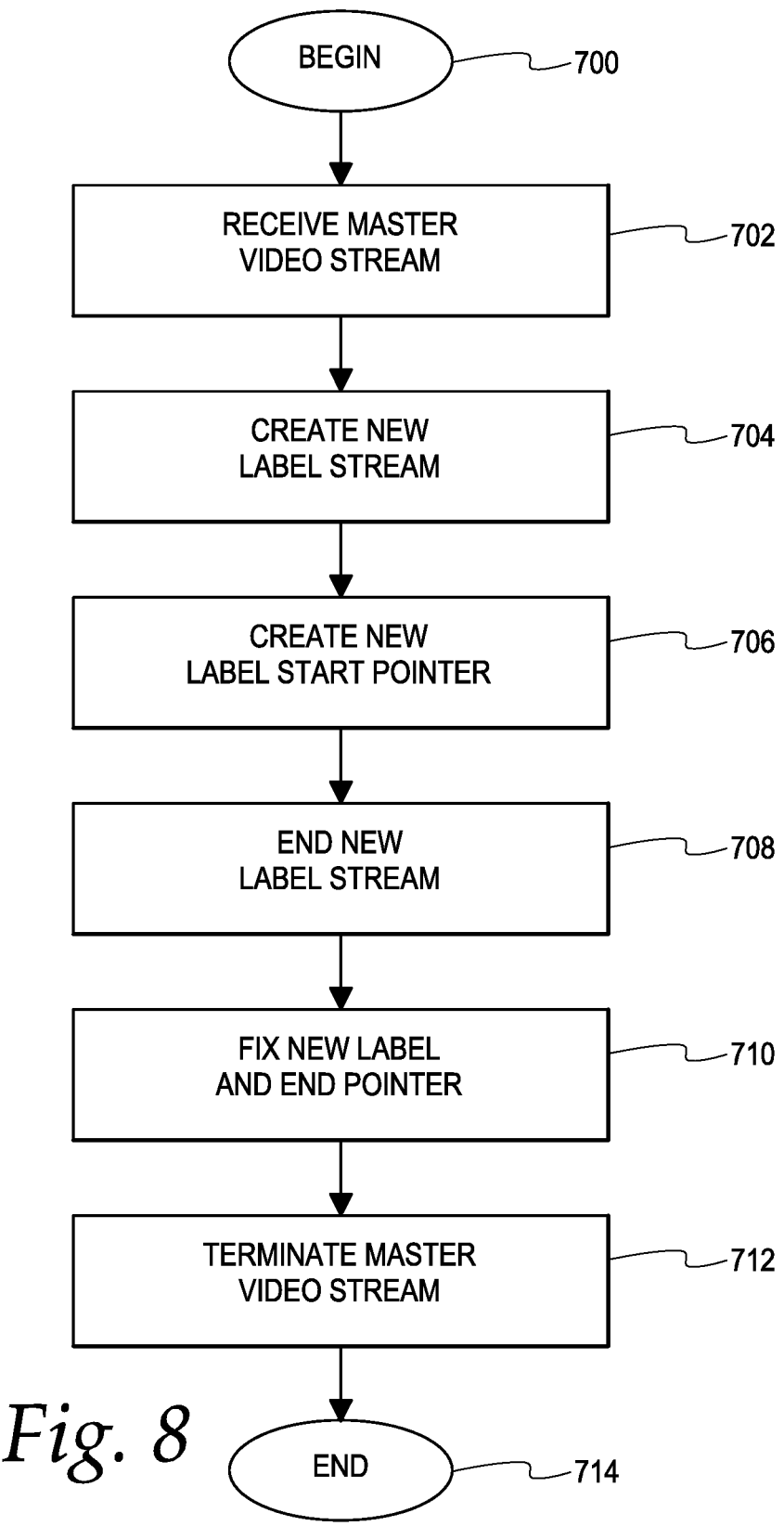
FIG. 8 is a simplified flow chart illustrating the operation of a wireless control device, implementing the label stream functionality disclosed herein.

Turning to FIG. 8, a simplified flowchart depicting the operation of a video recording system 100 utilizing the live streaming embodiment of FIG. 7. In particular, in step 700, the video recording system 100 is initiated; i.e., it is turned on, the wireless network 602 is initiated, etc. In step 702, the live stream is initiated by the digital camcorder 500 and received by the wireless control device 620. In accordance with the previous embodiment, this would create both a physical master stream that is recorded into persistent storage on the wireless control device 620 and a logical master stream. In step 704, a new label stream is created, and in step 706, the new label stream start pointer is created. As explained above, the new label stream's start pointer is set to the present end pointer of the logical label stream. In step 708, the label stream is ended, and its end pointer is fixed to the most recent value of the logical master stream in step 710. In step 712, the live stream is terminated, which can be accomplished by the digital camcorder ceasing its live stream or a user pressing the terminate function 640 on the wireless control device. In step 714, the video recording system 100 is turned off, ending the operation of the system.

The structure of the disclosed video recording system 100 has been set forth herein. With regard to its application, this system can have several advantageous uses. The first application would be for the recording of a live performance that will consist of numerous subparts, such as, for example, a school talent show. At such a performance, the video camera operator could create a separate label stream for each performance, and name the streams appropriately; i.e., a first label stream could be named John Smith (assuming that John Smith was the student performing), while a second label stream could be named Ann Jones. Then, the individual label streams could be exported to a website, and parents could then download only the video applicable for their child.

The disclosed video recording system 100 could also be integrated into a security camera system deployed at, for example, a workplace. The disclosed video recording system 100 could be adapted to create separate label streams for each event, such as a particular location within the workplace (like the kitchen or shop floor) over a particular time frame, such as 10 AM to 10:30 AM.

The disclosed video recording system 100 could also be integrated into a traffic camera system deployed at a stoplight. Separate label streams could be created every time that a traffic light changed states, such as from green to red or vice versa. Such a system would allow the system operators to easily identify applicable video when, for example, a person that received a violation notice due to the traffic camera system chose to challenge that violation.

Similarly, the disclosed video recording system 100 could be integrated into an operating room black box system. As an operation proceeded, the video camera operator could create different label streams for each phase of the operation; i.e., preparation, initial incision and cut down, tumor resection, closure, and clean up (assuming the procedure involved the removal of a tumor). Such a system would allow a subsequent viewer to easily access only the part of the operation that was of concern.

The preceding description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this disclosure is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional disclosures are not dedicated to the public and the right to file one or more applications to claim such additional disclosures is reserved.

What is claimed is:

1. A video recording system comprising:
   a body including a lens;
   a sensor disposed within the body and optically coupled to the lens, the video sensor producing a stream of digital video data;
   a video processor coupled to the sensor, the video processor processing the stream of digital video data and producing digital video frame data;
   a storage device comprising a plurality of physical memory locations coupled to the video processor, the storage device storing a physical master stream in the physical memory locations including the digital video frame data;
   a processor coupled to the storage device, the processor maintaining a logical master stream of video, the logical master stream of video data comprising a start pointer and an end pointer wherein the start pointer is a pointer to the physical memory location defining a beginning of the physical master stream, and the end pointer is a pointer that is continuously updated to point to the most recent digital data stored in the physical master stream; and
   an input control coupled to the processor that, on activation, is adapted to create a second logical stream of video while the processor continues to maintain the logical master stream of video, the second logical stream of video comprising a second start pointer and a second end pointer, wherein the second start pointer is adapted to be set to the value of the end pointer at the time that the second logical stream is created, and wherein, on activation of the input control a second time, the second end pointer is adapted to be set to the value of the logical master stream end pointer at the time the input control was activated the second time.

2. The video recording system of claim 1 wherein, on activation of the input control a second time, the second logical stream of video is adapted to be labeled with a name.

3. The video recording system of claim 2 wherein, the input control is adapted to create a third logical stream of video on activation a third time, the third logical stream of video comprising a third start pointer, the third start pointer is adapted to be set to the value of the end pointer at the time that the input control was activated a third time.

4. The video recording system of claim 3 further comprising a network interface and wherein the input control is adapted to be activated by a network command.

5. The video recording system of claim 1 wherein the body comprises a smartphone body.

6. The video recording system of claim 1 wherein the body comprises a digital camcorder body.

7. The video recording system of claim 1 wherein the body comprises a digital camera body.

8. The video recording system of claim 1 wherein, on activation of the stream control a second time, the second logical stream of video is adapted to be labeled with a name.

9. A video recording system comprising:
   a digital recording device including a wireless network port, the digital recording device being adapted to capture video and stream the video over the wireless network port;
   a wireless control device including a second wireless network port and a touch sensitive display, the display including a stream control, wherein the second wireless network port is adapted to receive the video streamed by the digital recording device, and wherein the display is adapted to show the video and a stream control;
   the wireless control device having a storage device comprising a plurality of physical memory locations, the storage device storing a physical master stream in the physical memory locations;
   the wireless control device having a processor coupled to the storage device, the processor maintaining a logical master stream of video, the logical master stream of video comprising a start pointer and an end pointer wherein the start pointer is a pointer to a physical memory location defining a beginning of the physical master stream, and the end pointer is a pointer that is continuously updated to point to the most recent video stored in the physical master stream; and
   wherein, on activation of the stream control, the processor is adapted to create a second logical stream of video while processor continues to maintain the logical master stream of video, the second logical stream of video comprising a second start pointer and a second end pointer, wherein the second start pointer is adapted to be set to the value of the end pointer at the time that the second logical stream is created, and wherein, on activation of the stream control a second time, the second end pointer is adapted to be set to the value of the logical master stream end pointer at the time that the input control was activated the second time.

* * * * *